(No Model.) 3 Sheets—Sheet 1.
C. F. PIKE.
APPARATUS FOR TREATING PLACER DIRT.
No. 581,035. Patented Apr. 20, 1897.
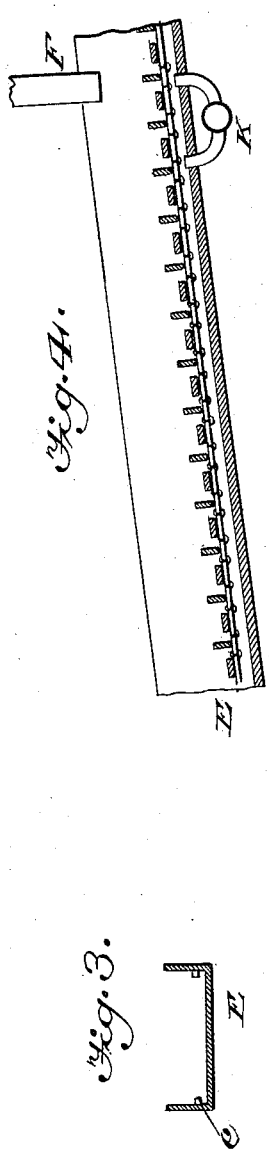
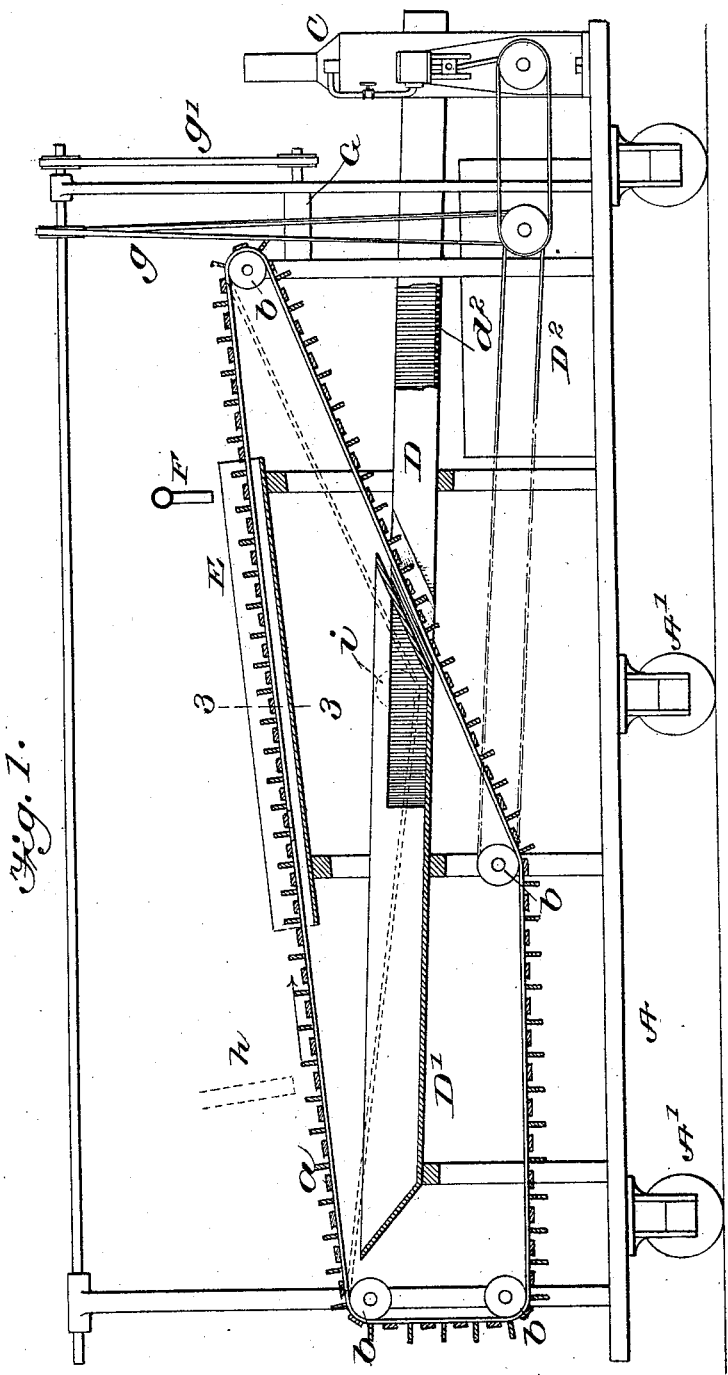
Witnesses
R. W. Bishop
John Dominie
Inventor
Charles F. Pike
By / Homer Pettee
his Atty.

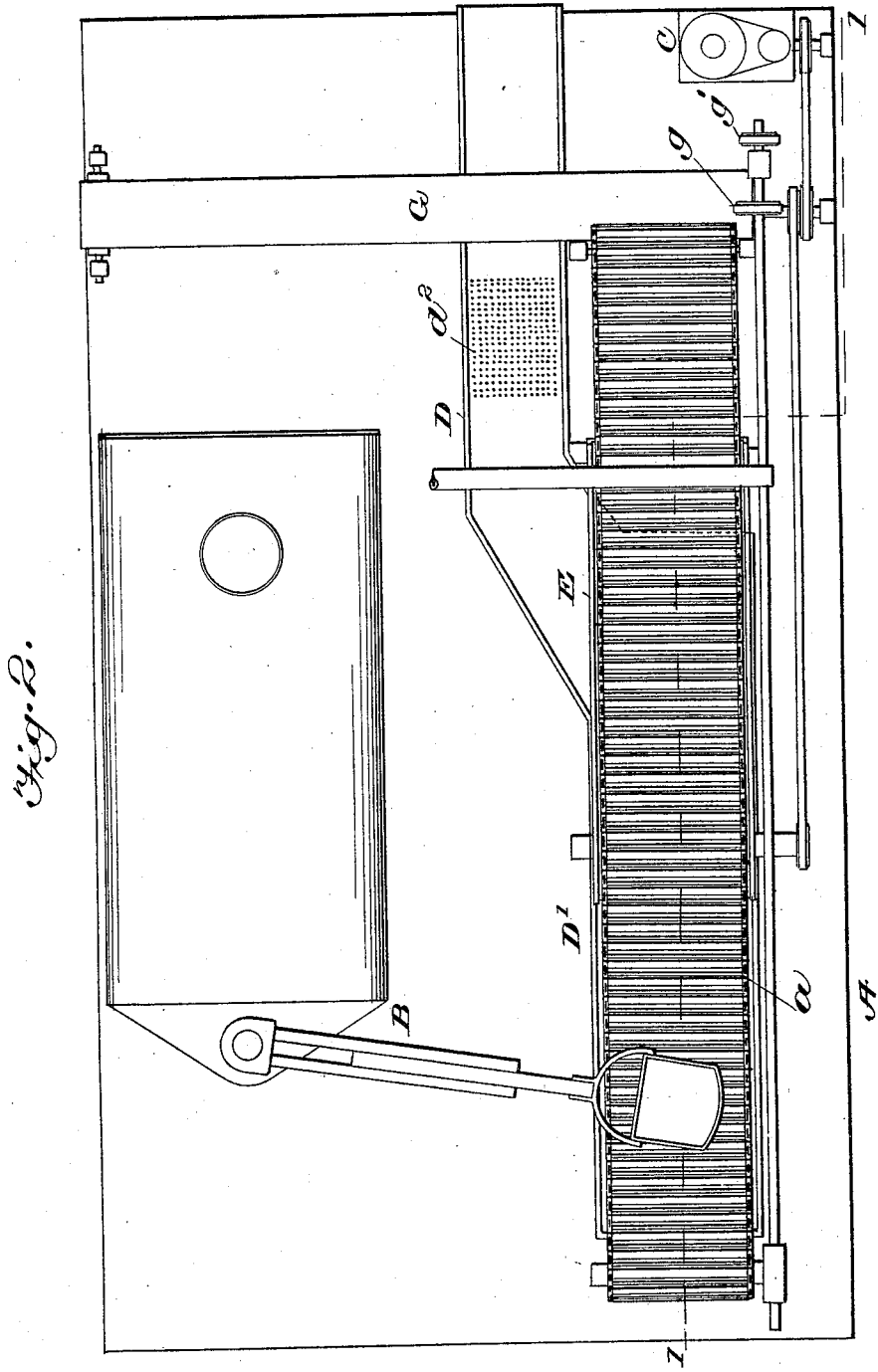

(No Model.) 3 Sheets—Sheet 3.
C. F. PIKE.
APPARATUS FOR TREATING PLACER DIRT.
No. 581,035. Patented Apr. 20, 1897.
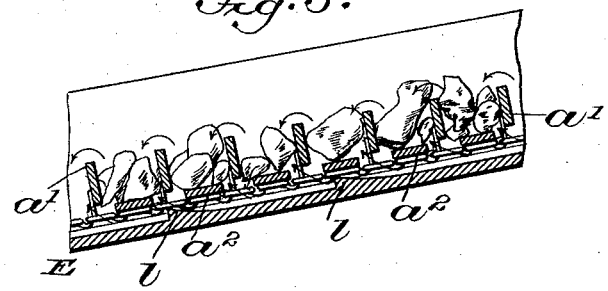
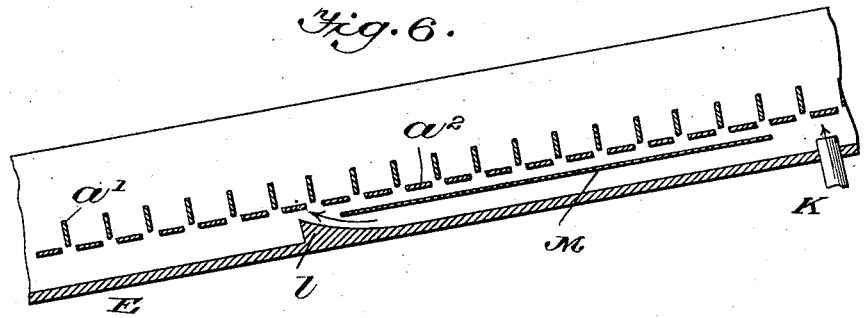
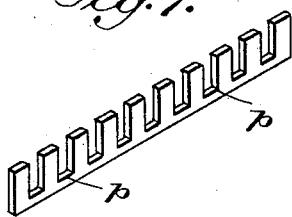
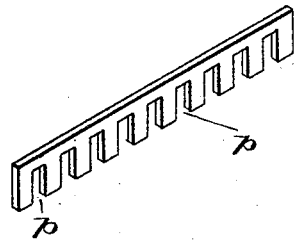
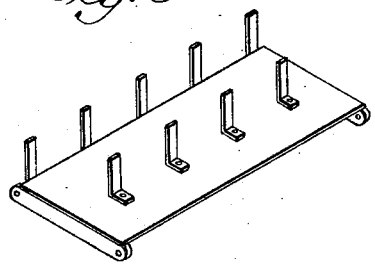
Witnesses
R. W. Bishop
Inventor
Charles F. Pike

UNITED STATES PATENT OFFICE.

CHARLES F. PIKE, OF PHILADELPHIA, PENNSYLVANIA.

APPARATUS FOR TREATING PLACER-DIRT.

SPECIFICATION forming part of Letters Patent No. 581,035, dated April 20, 1897.

Application filed November 20, 1896. Serial No. 612,888. (No model.)

*To all whom it may concern:*

Be it known that I, CHARLES F. PIKE, a citizen of the United States, and a resident of the city of Philadelphia, State of Pennsylvania, have invented a certain Apparatus for Treating Placer-Dirt, of which the following is a full, clear, and exact description, reference being had to the accompanying drawings, forming part of this specification.

My invention relates to the separation of fine dirt and metal from placer-gravel, its object being to so operate upon the placer-gravel that all of the heavy rocks and larger stones will be thoroughly and completely washed by the use of a minimum quantity of water and freed from the soil and clay, the coarse matter being then thrown away and the finer portions saved to be subsequently treated for the recovery of the contained precious metal.

One of the great difficulties to be met in placer-mining districts is the scarcity of water. One of the main objects of my invention is to provide a process and apparatus for subjecting the gold-bearing material to the most complete washing with a minimum quantity of water, securing the greatest results from a given quantity of water.

In the material which I more particularly desire to act upon the gold is found in the form of fine metallic particles adhering with the soil and clay to the rocks and stones, and it requires a very thorough and violent washing to dissolve the soil and clay and free the particles of gold. I have found in practice that ordinary washing of this gold-bearing material by directing a jet or stream or a series of jets or streams of water against it is not sufficient to effect the thorough washing necessary to work on a commercial basis. I have, however, found that the desired result may be accomplished by subjecting the material to constant contact with a stream of running water in such manner that the water will be agitated and continually thrown against the rocks and stones from all sides, the series of contacts with the partly-divided stream of water gradually wearing away the adhering clay and soil from the stones until the washing is complete and the stones pass from the water perfectly free and clean.

It is clear that in my construction of apparatus the conveyer must be of such a character that it will carry the material to be washed through the trough, yet at the same time that it shall be sufficiently open to allow the water in the trough free access to the material to be washed from below the conveyer or above, or both, in fact on all sides, the object being to present the greatest amount of surface of the material being treated to the water as it flows through the trough and at the same time to operate in such a manner that the greatest possible disintegrating force from the current of water will be attained. This is best effected in the construction described where the water-supply is limited by confining the water in the long narrow trough and operating the conveyer in the opposite direction to the flow of water against the current of water and out of contact with the bottom of the trough.

My invention consists in the hereinafter-described apparatus for treating placer-gravel and in the construction of the devices for carrying out such invention.

In the accompanying drawings, Figure 1 is a sectional elevation on the line 1 1, Fig. 2, of an apparatus constructed in accordance with my invention and designed to carry the method of operation into effect. Fig. 2 is a plan view of the same. Fig. 3 is a transverse sectional elevation on the line 3 3, Fig. 1, illustrating the construction of the wash-trough. Fig. 4 is a longitudinal sectional elevation illustrating one form of grizzly for carrying the material to be acted upon through the water. Figs. 5 and 6 are views similar to Fig. 4, showing other constructions of the grizzly and the water-containing vessel; and Figs. 7, 8, and 9 are detached perspective views illustrating constructions of bars or slats from which the grizzly may be formed.

To treat placer-gravel successfully on a commercial scale, especially where the material is not extremely rich and where the gold recovered is in fine particles, it is necessary that all of the gravel treated should be very thoroughly and completely washed and all of the fine material saved for subsequent treatment, and at the same time the separating and washing apparatus must be in the immediate vicinity of the material to be acted upon in order that the expense of cartage or carrying may be avoided.

In carrying out my invention I place the washing apparatus, the engine or other device which is to operate the same, and a shovel, scoop, endless-chain carrier or equivalent digging or ditching device on a wheeled platform and travel the same toward and through the bank of placer-gravel to be operated upon. The digging mechanism is located at or near the front of the platform and gradually digs its way through the bank, lifting the dirt gradually and continuously, and depositing it on an endless grizzly, which latter device carries the dirt through a body of water, effecting a very thorough and complete washing of the larger stones or rocks which are always found in placer-deposits. The larger stones or rocks after being washed are carried by an auxiliary carrier to one side or to the rear of the platform, so as not to interfere with the advancement of the work, while the finer material is saved to be subsequently treated for the recovery of the contained gold.

Referring to the drawings, A represents a platform mounted on a series of wheels A' and carrying a steam-shovel B and a steam or other engine C. On the platform is also mounted the apparatus for effecting the washing of the material delivered thereto by the steam-shovel. On suitable supports on the platform is a sluice-box D, having an offset portion D' at one end, the portion D of the sluice extending toward the rear of the machine over a suitable receiver $D^2$, in which the material to be saved falls through a perforated plate $d^2$ in the bottom of the sluice and is gradually collected, while the surplus water may be wasted, or where water is scarce it may be pumped through the supply-pipes and used over and over again. Mounted above the sluice-box and inclined in a direction opposite the sluice-box is an open elongated trough E, provided on each side with guiding-rails $e$, and above the higher end of the trough are one or more water-supply pipes F, adapted to discharge a continuous stream or streams of water into the trough, the supply being sufficient to keep the trough partially full and the water discharging from the lower end of the trough into the sluice-box.

$a$ represents a slatted belt, usually termed a "grizzly," on which is deposited the placer-gravel to be washed. This belt is guided by a series of wheels $b$, mounted on suitable supporting-shafts and driven by the engine C, the grizzly being moved continuously in the direction of the arrow, Fig. 1, and traveling the material to be treated through the wash-trough E in a direction opposite to the direction of travel of the water therein.

In operation the gravel is raised by the steam-shovel and deposited on the grizzly or on a platform or a preliminary carrier leading to and discharging upon the grizzly, which then carries such material through the wash-trough E and subjects it to the action of the water supplied by the pipe F, the grizzly traveling in a direction opposite to the travel of the direction of the water and thus agitating the water so that it will be forcibly dashed against all sides of the stones and rocks, dissolving or washing off all adhering clay and dirt, which sinks to the bottom of the trough and is carried to the sluice-box and from thence to the collecting-box. The larger stones and rocks remain on the grizzly and are carried forward until they fall onto an auxiliary carrier G, which delivers them to a dumping-ground at one side or to the rear of the platform. The carrier G is connected by suitable belts $g$ $g'$ $g^2$ to the engine C. The material when first placed upon the grizzly may be subjected to the action of a stream of water issuing from a pipe $h$, (shown in dotted lines in Fig. 1,) so that a portion of the clay and soil may be washed away or loosened and dropped into the sluice-box before the grizzly enters the wash-trough E.

In some instances the wash-trough may be dispensed with and the grizzly be depressed by guiding-wheels $i$ into the water in the sluice-box, as shown by dotted lines in Fig. 1, although this will not be quite as effective as the washing in trough E, as the water and the grizzly will both be traveling in the same direction, the grizzly traveling slower than the water, so that the latter will be enabled to more thoroughly wash the same. When the grizzly is depressed directly into the sluice-box, as shown by dotted lines in Fig. 1, its direction of travel may, however, be changed and the grizzly travel in a direction opposite to the direction of flow of the water, so that the effect will be the same as if the washing occurred in the trough E.

The washing of the material by the water supplied through the pipe F may be supplemented by one or more jet-pipes K, as illustrated in Figs. 4 and 6, adapted to direct a stream or streams of water upwardly against the bottom of the grizzly and passing through the slats of the grizzly into contact with the rocks and stones carried thereby. This same effect may in a measure be gained by providing upwardly-inclined projections or water-deflectors $l$ in the bottom of the wash-trough in such manner that the water flowing rapidly down along the bottom of the trough will be raised at intervals and directed with considerable force against the bottom of the grizzly. To strengthen or increase the force with which the water impinges against the under surface of the grizzly, I provide between the bottom of the grizzly and the bottom of the trough a division-plate M, which will in a measure guide the water in the form of a jet, so that it will act with better effect on the material.

In Fig. 5 I have shown a grizzly in which the slats or bars $a'$ $a^2$ are alternately arranged in substantially vertical and horizontal positions, forming long narrow pockets extending for the full width of the grizzly and adapted to receive the rocks and stones to be washed. The arrangement of these bars or slats is such that each of the lower corners of the so-formed pockets will be open, and the water will follow in general the courses indicated by the arrows in Fig. 5, entering the openings between the slats and impinging against the surface of the stones, which are turned and rolled about in contact with each other until all of the adhering clay and soil is washed away, while at the same time the travel of the grizzly through the running water induces a series of minute waterfalls, which leap over the vertical bars and fall on the rocks and stones.

In Figs. 7 and 8 these vertical bars are shown as provided with a series of openings $p$, through which the water may pass and be divided in each of the compartments into a series of small streams, which in seeking to escape will travel around nearly all sides of the stones, joining and commingling with other minute streams and then passing through the openings into the next compartment, and so on throughout the series, the water being violently agitated and forced time and time again into contact with the sides of the stones until all of the clay and soil is dissolved.

In Fig. 9 is illustrated a construction of grizzly which may be employed with the same effect as that illustrated in Fig. 7, the horizontal bar being formed by a flat metallic plate and the vertical bars being in the form of staggered teeth riveted or otherwise secured to the surface of the plate.

It will be understood that various other modifications of the construction of grizzly and the trough and sluice may be made without departing from my invention.

Having thus described my invention, what I claim, and desire to secure by Letters Patent, is—

1. In an apparatus for treating placer-gravel with a limited supply of water, an endless open belt having projections in the face of the same for engaging the material to be carried thereby, an elongated narrow wash-trough provided at an incline through which the upper ply of said endless belt is adapted to travel, devices for supporting and guiding said belt and for elevating that portion of the same traveling in said trough above the bottom of the trough to allow the water and disintegrated material a passage below as well as above said belt, a water-supply at the upper end of said trough adapted to flow in the opposite direction to the travel of said belt in said trough, the said belt being constructed to allow the surfaces of the ore to be treated free exposure to the full force of the oppositely-traveling current of water, mechanism for operating said belt, and an enlarged sluice-box provided at an incline below said wash-trough for receiving the water and disintegrated material from the tail of said wash-trough and for conveying said material away for screening and subsequent treatment, substantially as described.

2. An apparatus for washing ore by means of a minimum quantity of water consisting of an elongated narrow wash-trough placed at an incline and open at opposite ends, a grizzly consisting of an open endless carrier constructed to travel through said wash-trough above and out of contact with the bottom of the same, means for operating said grizzly, a water-supply at the upper end of said trough, and a sluice-box provided beneath said wash-trough for conveying away the material washed from the lower end of said wash-trough for separating and distributing the same, substantially as described.

3. An apparatus for washing ore by means of a minimum quantity of water consisting of a sluice-box, D, having an offset, D', connected therewith, an elongated wash-trough, E, provided above said offset, D', in a perpendicular line therewith, an open conveyer, $a$, provided on pulleys, $b$, said conveyer guided to pass through said wash-trough above the bottom of the same and around the opposite ends of said offset, D', substantially as described.

4. In an ore-treating apparatus, a sluice-box, D', having an offset portion, D, a traveling endless carrier, $a$, provided on pulleys, $b$, having the portion, D', of the said sluice-box within the lines of the said carrier and parallel with the same, a wash-trough, E, through which the said carrier is adapted to travel, and inclined to direct the current of water in an opposite direction to the line of travel of the said carrier as it travels through said trough, a water-supply, F, and means for operating the said carrier, substantially as described.

5. In combination, a vessel for containing a body of running water, a grizzly traveling therein, the bottom of said vessel having water-deflectors to direct the running water upwardly against the bottom of the grizzly.

6. In combination, a vessel for containing a body of running water, a grizzly traveling therein, water-jet pipes in the bottom of said vessel, and water-deflectors in the bottom of said vessel to direct the running water against the bottom of the grizzly.

7. In combination, a vessel for containing a body of running water, a grizzly traveling therein, the bottom of said vessel having water-deflectors to direct the water against the bottom of the grizzly and a division-plate between the bottom of the vessel and the bottom of the grizzly.

8. In combination, a vessel for containing a body of running water, a grizzly traveling therein, the bottom of said vessel having a water-deflector to direct the water against the bottom of the grizzly, a division-plate between the bottom of the vessel and the bottom of the grizzly, and a water-jet pipe in the bottom of said vessel for directing a jet of water upwardly against the grizzly.

In witness whereof I have hereunto set my hand this 19th day of November, A. D. 1896.

CHARLES F. PIKE.

Witnesses:
JNO. E. PARKER,
EDMUND S. MILLS.